United States Patent [19]

Ludwig et al.

[11] 3,823,265

[45] July 9, 1974

[54] CODE-CONTROLLED TELEPRINTER HAVING A TYPE CYLINDER WHICH CAN BE ADJUSTED BY MEANS OF A STEPPING MOTOR

[75] Inventors: Martin Ludwig; Hanns Joerg Senger, both of Munich, Germany

[73] Assignee: Siemens Aktiengesellschaft, Berlin & Munich, Germany

[22] Filed: Nov. 9, 1972

[21] Appl. No.: 305,008

[30] Foreign Application Priority Data

Nov. 11, 1971 Germany .......................... 2156093

[52] U.S. Cl. .............................. 178/34, 178/53.1 R

[51] Int. Cl. .............................................. B41j 1/50

[58] Field of Search ............ 178/69.5 R, 53, 53.1 R, 178/23 A, 34; 101/93 C; 197/49

[56] References Cited

UNITED STATES PATENTS 3,399,753 9/1968 Revelle ................................ 178/34

3,565,230 2/1971 Webberley et al. .............. 101/93 C

*Primary Examiner*—Thomas A. Robinson

*Attorney, Agent, or Firm*—Hill, Gross, Simpson, Van Santen, Steadman, Chiara & Simpson

[57] ABSTRACT

A teleprinter having a type cylinder wherein the instantaneous position of the type cylinder is known through a comparing system which utilizes a binary counter. A synchronizing mark is provided on a timing disc carried for mutual rotation with the type cylinder and is associated with a frequently occurring predetermined character, e.g., a character E, which allows adjustment of the binary counter independently of other adjustments to the code mark associated with the predetermined character by means of a synchronizing pulse as soon as this mark is sensed by an associated sensing element as a printing position or during passage thereof.

3 Claims, 9 Drawing Figures

CODE-CONTROLLED TELEPRINTER HAVING A TYPE CYLINDER WHICH CAN BE ADJUSTED BY MEANS OF A STEPPING MOTOR

BACKGROUND OF THE INVENTION

1. Field of the Invention

This invention relates to a code-controlled teleprinter for an n-step code having a type cylinder which can be adjusted by means of rotation caused by a stepping motor and a code comparing system with marks which can be sensed and which are carried upon a disk or roller which is rotated along with the type carrier. In this manner, a disk with code marks (for example in five rows in a five-digit code arrangement) is utilized with prior art machines.

2. Description of the Prior Art

A teleprinter is known in the art which comprises a steadily rotating type wheel (German Pat. No. 1,055,047, corresponding to U.S. Pat. No. 2,927,960, issued Mar. 8, 1960) wherein an n-digit electronic binary counter is employed which can be controlled by way of stepping marks arranged in a row at the circumference of a timing disk. These reference marks are scanned instead of using a cumbersome arrangement with code marks in, for example, five rows with five converters whereby the position of the binary counter is respectively electronically compared with the code combination associated with the type which is to be printed. For this purpose, a further scanning member supplies a pulse for reset for each rotation and therefore for the synchronization of the counter.

SUMMARY OF THE INVENTION

This invention has as its primary object the provision of means to guarantee the coincidence of the instantaneous position of the type cylinder and a binary counter in a teleprinter of the type mentioned above comprising a comparing system with a binary counter as described above. This object is achieved according to this invention in such a way that a synchronizing mark provided on the timing disk circumference is associated with a frequently occurring predetermined character (the character E) which permits an adjustment of the binary counter independently of other adjustments to the code mark associated with this predetermined character by means of a synchronizing pulse as soon as this mark is sensed by an associated sensing element at a printing position or during passage of the sensing element by the mark. It is guaranteed in this manner that synchronization occurs often in a text, for example, in a German text if the letter E is selected.

According to a further development of the invention, a decoder is provided ahead of an input shift register in parallel with respect to the system blocking gates, which decoder recognizes special function combinations which are designed for the printing of characters. This decoder will block these gates when such combinations occur and will apply the code combination associated with the synchronizing pulse to the input register, switch off the electronic comparing device and render the stepping motor control dependent only on the synchronizing pulse. In this manner, the binary counter is necessarily synchronized with the type carrier with each control function combination.

According to another further development of the invention, a teleprinter having the aforementioned features is characterized in that an additional decoder is provided for the production of an auxiliary pulse train and is arranged in the binary code combination succession and recognizes code combinations positioned ahead of special function code combinations in order to reach the binary counter without a simultaneous further switching of the type carrier and for avoiding gaps in the type carrier when code combinations occur which are associated with special functions which are not to be printed. In this manner, it is possible to utilize a type cylinder comprising rows of 26 characters, respectively, particularly without interfaces, while otherwise 32 printing locations would be required for each row at the circumference of the cylinder.

For a teleprinter having a device for reaching the next circumferential position of the type, which must be adjusted, while proceeding from the last assumed position and while traversing the shortest path, a test binary counter is provided which can be adjusted in the advance direction according to a preferred embodiment of the invention. Also, a timing frequency, such as a 200 kHz frequency, is provided and the demanded adjustment of the binary counter can be simulated in the test binary counter. A timing counter which can be controlled by way of the test binary counter is provided which will cause an adjustment of the stepping motor in the advance direction if half the number or less of printing positions is counted along the circumference and, if this number is exceeded, the timing counter will effect an adjustment of the stepping motor in the reset direction. A test decoder similar to the additional decoder is provided between the test binary counter and comparing device in such a way that it is suited to insert an auxiliary timing frequency when a location is reached in the test binary counter which is associated with a special function. In this manner, the adjustment of the favorable rotary direction of the type carrier can be effected without any loss of time.

BRIEF DESCRIPTION OF THE DRAWINGS

Other objects, features and advantages of the invention, its organization, construction and operation will be best understood from the following detailed description of a preferred embodiment thereof taken in conjunction with the accompanying drawings, on which.

DESCRIPTION OF THE PREFERRED EMBODIMENT

Figure 1:
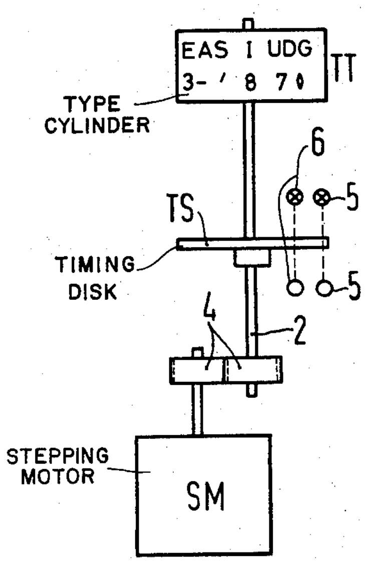
FIG. 1 is a pictorial and schematic illustration of a type cylinder and its rotary drive mechanism.
Figure 2:
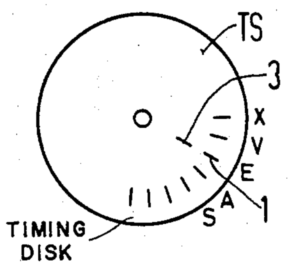
FIG. 2 is a plan view of a timing disk employed in the apparatus of FIG. 1.

The five digits of a teleprinter symbol reach a receiving register in a teleprinter constructed for a five-digit code and 100 Baud typing speed, the receiving or input register including an electronic series/parallel converter. The type carrier of the printing mechanism is embodied, as illustrated in FIG. 1, as a type cylinder TT which is rotated by a stepping motor SM, and having a timing disk TS attached and carried upon its shaft 2 for rotation therewith. The timing disk TS is illustrated in FIG. 2 as a plan view. The timing disk comprises symbol marks 1 located at a predetermined radial distance from the shaft 2. The marks 1 are scanned by an optical converter 5, 5. A mark 3 is arranged at a different radius and occurs only once per revolution and servies for producing a synchronizing pulse SI. In order to be able to utilize a stepping motor for 24 steps per revolution, the arrangement according to FIG. 1 comprises a gear reduction mechanism 4 having a ratio 24:26. The mechanism 4 is illustrated in FIG. 1, but has been omitted from the other drawings for simplicity.

Figure 3:
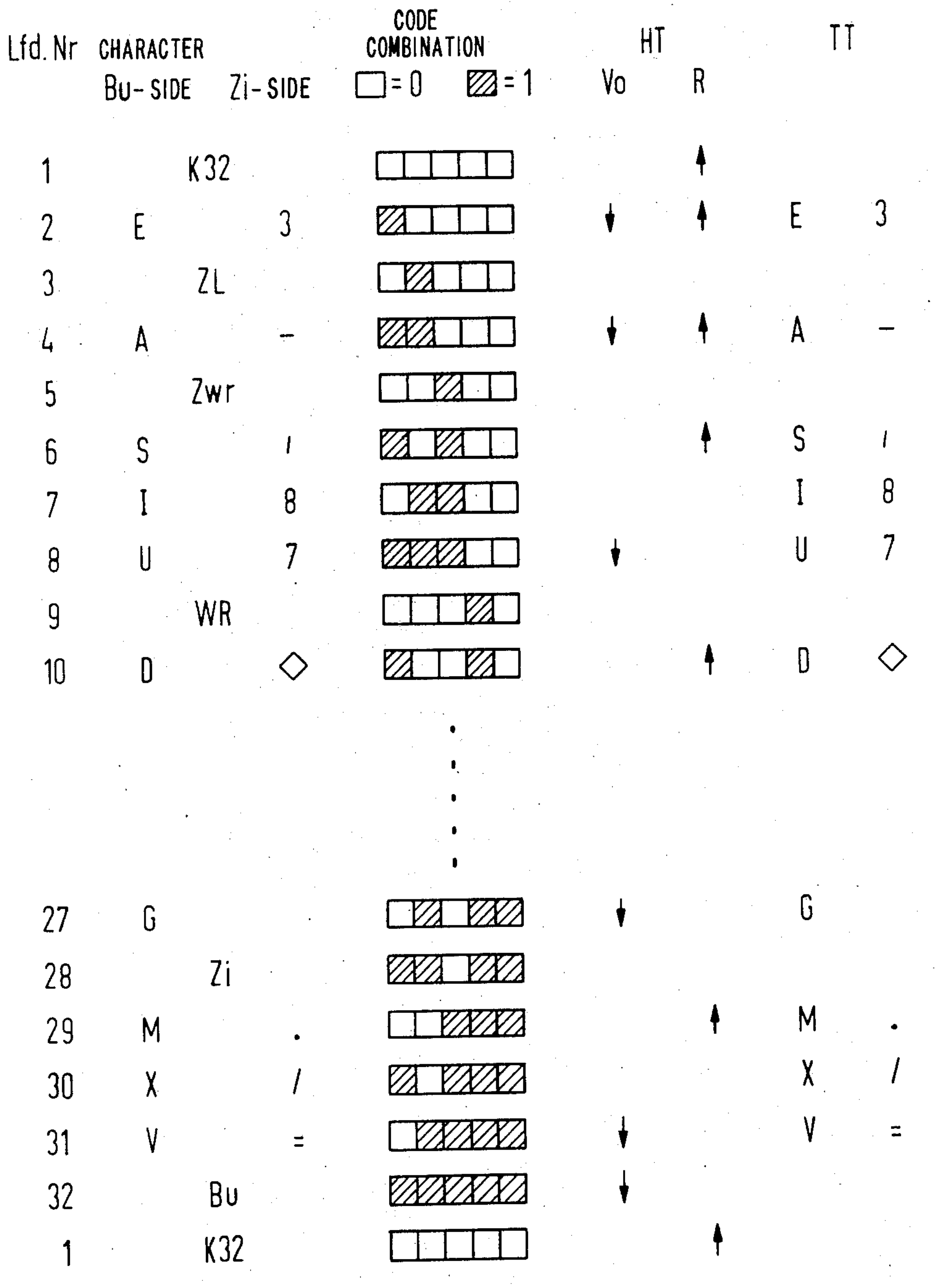
FIG. 3 is a tabular representation of the associated binary counter combinations and its successions, the associated characters and those locations which are associated with auxiliary timing pulses.

The contents of a five-digit binary counter BZ corresponds to the binary number which permits expression of the code combination associated with the instantaneous position of the type cylinder TT. The construction of the binary counter may, for example, correspond to that which is disclosed in the aforementioned patent. A comparing device V compares parallel bits of the characters stored in the input register ER with the contents of the binary counter BZ. The counter is switched further by one digit in the five-digit dual system when an individual timing pulse arrives. The process for adjusting the type cylinder TT (FIG. 4) is effected as follows. The timing disk TS supplies a symbol timing pulse ZT for each symbol on the type cylinder TT during its rotation. This timing pulse ZT will switch the binary counter BZ further. The 32 bit combinations of the five-digit code are illustrated in the five-digit binary counter. FIG. 3 shows the 32 possible positions of the binary counter and the association with respect to the characters or numerals, respectively, of the telegraph alphabet No. 2.

The type carrier TT, and thus the timing disk TS, may be in any desired position. The contents of the binary counter BZ is supposed to correspond to the instantaneous position of the type cylinder TT. A symbol which is to be printed is received and stored in parallel in the input register ER. In the case of coincidence in the comparing device V, a printing order for the character can be released at the output A. If no coincidence is obtained in the parallel bit comparison of the contents of the binary counter BZ with the contents of the input register ER, the stepping motor SM is controlled by way of a gate G5, along with the associated stepping pulse SchT. The stepping motor will rotate in the advance direction (gate G2 open, gate G3 blocked). With each step (with each character upon the type cylinder TT), the timing disk TS will cause the generation of a symbol timing pulse ZT which, respectively, will switch the binary counter BZ further by one (or in the case of reset—gate G2 blocked, gate G3 open—will switch the counter back by one). The motor SM will run until coincidence is indicated in the comparing device V and the gate G1 is blocked by way of a control circuit ST. Then, the correct symbol is in the printing position.

The ability of controlling the control circuit in the advance (V*o*) or the reverse (R) direction is explained below. The instantaneous position of the type cylinder TT and the position of the binary counter must always coincide if the operation of the teleprinter is to be free of error. Therefore, a synchronization of the binary counter with the timing cylinder as often as possible is required. For this purpose, the timing disk TS will supply a synchronizing pulse SI, in addition to the symbol timing pulses TZ, when the synchronizing mark 3 (FIG. 2) passes a second light barrier 6 (FIG. 1).

The synchronizing mark is advantageously associated with a letter which occurs often in a language, for example the letter E. Each synchronizing pulse necessarily adjusts the binary counter to the bit combination representing the letter E, i.e. the type cylinder and the binary counter are synchronized. Since the letter E will occur most often in a normal German text, the desired synchronization occurs often. This is also effected when the "3" (compares to the bit combination E # with the CCITT Code No. 2) is to be printed or when the E (3) is passed during rotation of the type cylinder in the advance direction or the reverse direction.

It is furthermore provided that the letter E is automatically adjusted with the symbol combination number 32 (K32), line advance ZL, interspace Zwr, carriage return WR, numeral key Zi and letter key Bu, combinations occur, which combinations are not printed, as well as, for example, with voltage switch, change of operation (for example from "local" to "line") and during the construction of a connection; therefore, a synchronizing process is carried out in each of these instances. Thus, the type carrier TT and the adjusting electronic counter are synchronized after each word, in a worst case situation, so that synchronization is guaranteed practically all of the time.

Figure 4:
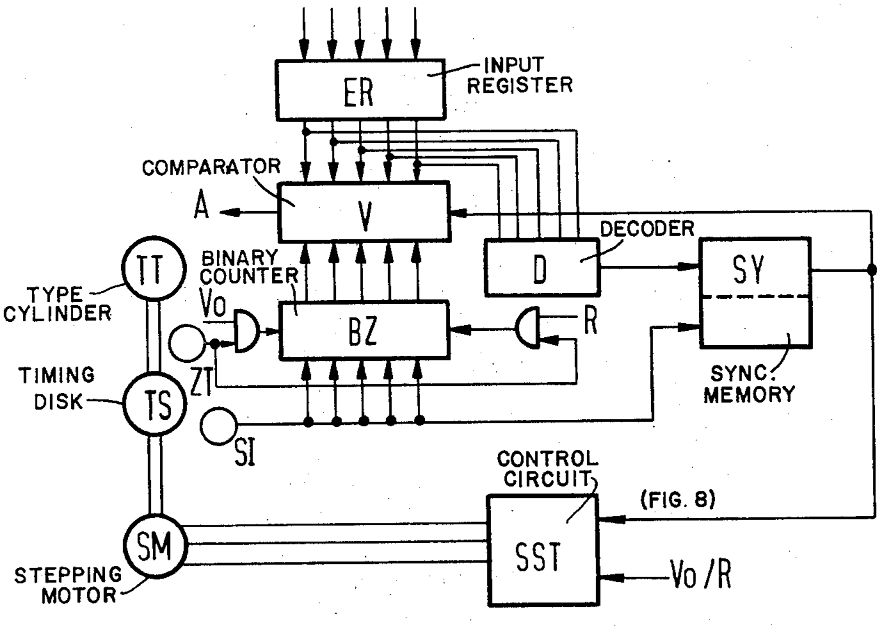
FIG. 4 is a logic block diagram of a circuit arrangement for providing synchronization between a type cylinder and a binary counter.

FIG. 4 explains the synchronization process. A received symbol is taken into the input register ER. Then the adjustment is effected, as described above. If the symbol E is passed during the adjustment (the mark 3 associated with the symbol 3 moves along the sensor 6 of FIG. 1) then the binary counter BZ will be adjusted to the bit combination E (10,000) by the synchronizing pulse SI produced thereby. Simultaneously, a bistable synchronization memory SY is reset.

If, however, one of the symbols E (3), K32 line advice ZL, interspace Z*wr*, carriage return WR, numeral key *Zi*, or letter key B*u* are received, a decoder D, which recognizes these symbols and which may comprise a construction similar to the gate circuit illustrated in FIG. 7, will cause the motor SM to rotate in the direction toward the code mark 3 (FIG. 2), advance or reverse according to criteria to be explained below. Operation of the motor is effected by way of the synchronizing memory SY, after a decision has been made as to which direction the motor SM must rotate. The bistable flip-flop stage, that is the memory SY, turns off the comparing device V; it should be noted that in this special case the motor movement may only be stopped by the synchronizing pulse SI which comes from the timing disk TS. The synchronizing pulse SI resets the synchronizing memory SY which causes the control circuit ST to stop the stepping motor SM.

The control circuit ST also reacts when the voltage is switched on, the type of operation is changed, and when a connection is constructed (these criteria being obtained in a prior art manner), as described above. In addition, the control circuit orders the decoder D to adjust the input register ER to the bit combination of the letter E.

The following circuit serves to guarantee the synchronization of the type cylinder TT and the binary counter BZ. The 32 possible bit combinations are permutated one after the other in the binary counter BZ by the symbol pulses ZT (FIG. 3). However, in order to save amount of rotation, moment of inertia and thus energy, only the 26 symbols which must be printed are placed in a plane upon the type cylinder TT. Therefore, an auxiliary timing pulse H must be interposed in the binary counter for the six symbols K32, ZL, Z*wr*, WR, Z*i*, and B*u*, which are not to be printed, in order to maintain the synchronism between the type cylinder TT and the binary counter BZ.

When the binary counter BZ reaches the positions E,A,U,G,V and Bu (FIG. 3) during the advance process, and during the reverse process, reaches the positions E,A,S,D,M and K32, then an additional decoder ZD is employed to recognize these bit combinations. This additional decoder may also comprise a construction that is similar to that of the gate circuit set forth in FIG. 7 and will produce an auxiliary timing pulse HT. The latter will advance or reset the binary counter BZ by one digit.

Figure 5:
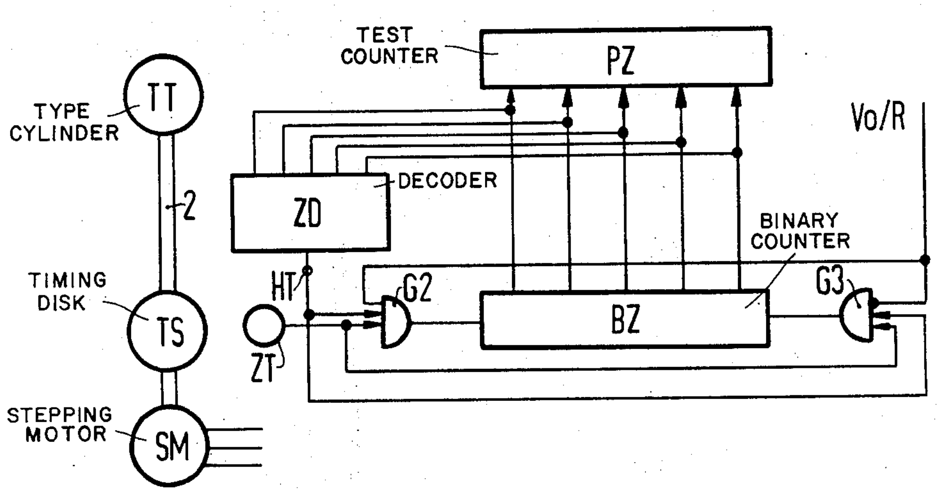
FIG. 5 is a schematic logic diagram of a system for guaranteeing the coincidence between a type cylinder and a binary counter.
Figure 9:
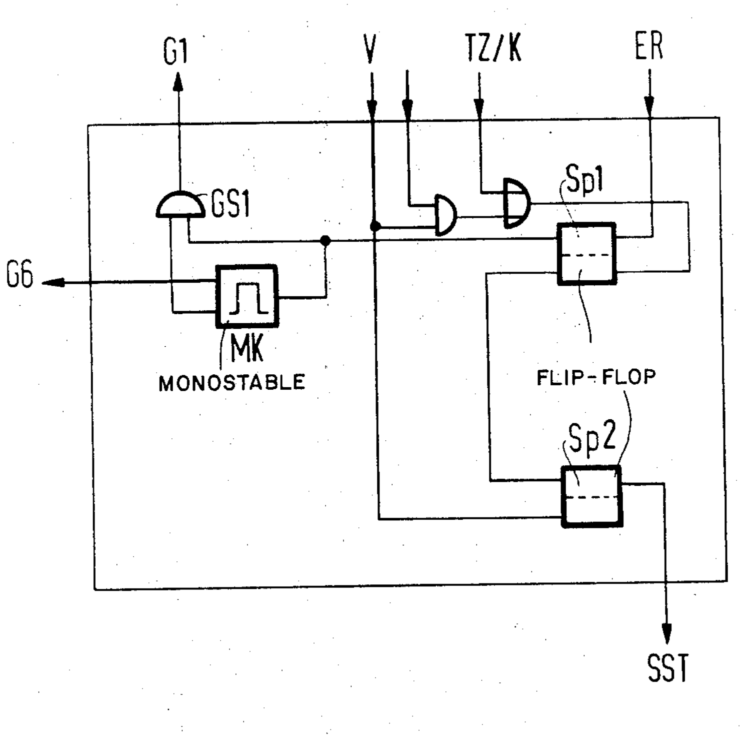
FIG. 9 is a logic circuit diagram of the control circuit of FIG. 6.

The procedure for the foregoing is explained with reference to FIG. 5. The control circuit ST (FIG. 9) will inform the additional decoder ZD whether the stepping motor SM advances or reverses. If the additional decoder ZD will recognize the bit combination U (FIG. 3) during an advance operation, for example, then it will generate an auxiliary timing pulse HT, for example, 10 microseconds later, which pulse will advance the binary counter BZ by one digit by way of the gate G2. If, however, the comparing device V determines coincidence at the bit combination U, then the control circuit will block the gate G2, for example approximately five microseconds before the auxiliary timing pulse appears.

The auxiliary timing pulse cannot further advance the binary counter. This only happens when the stepping motor SM is to be advanced during the next symbol which is to be printed.

Corresponding procedures occur during operation in the reverse direction. Instead of U, the auxiliary timing pulse is associated with the letter B (FIG. 3) in the above example.

Figure 6:
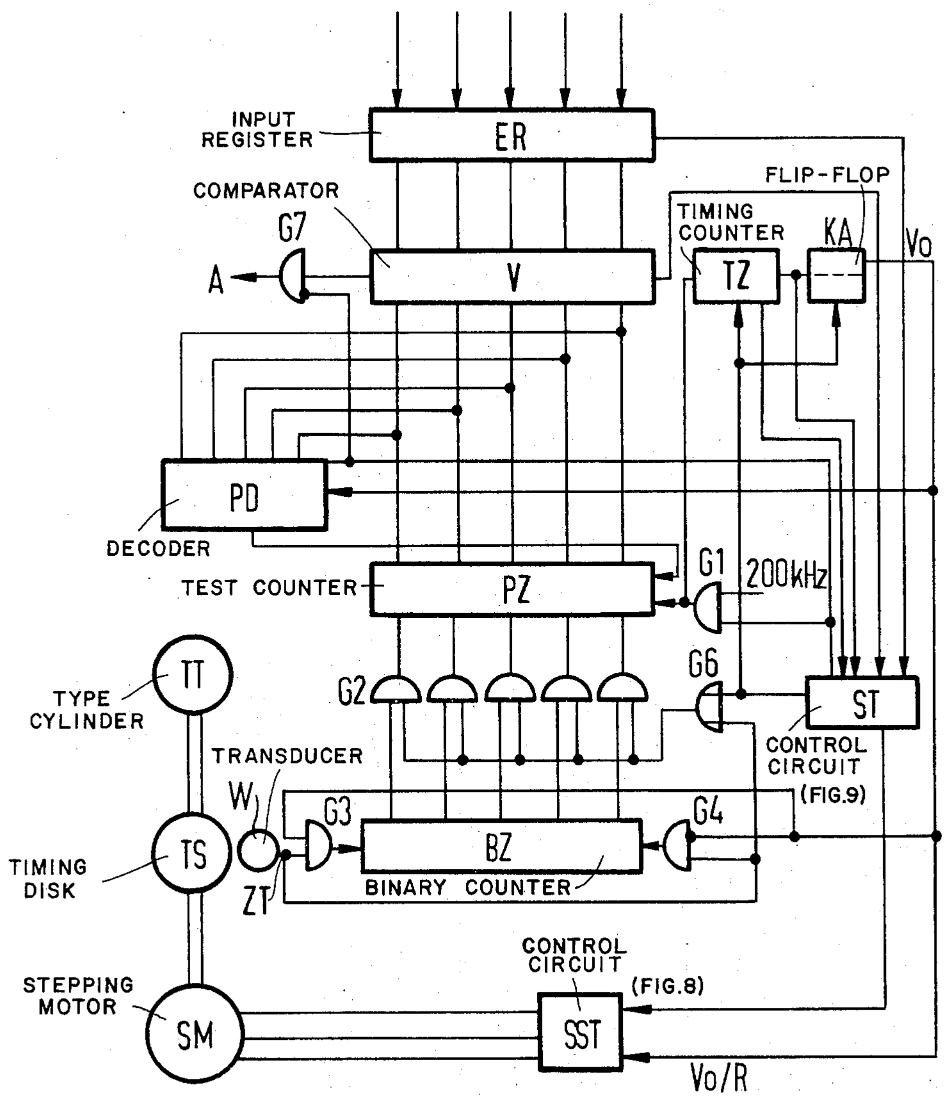
FIG. 6 is a schematic logic diagram for the entire control unit for a teleprinter constructed in accordance with the principles of the present invention.

The entire adjusting process of the type carrier TT, without taking into account the synchronization of the type carrier, which has been discussed above, along with the code combination for the letter E in the binary counter BZ and the measure for switching further the binary counter when a symbol is provided which is not present on the type carrier, will be described with the help of FIG. 6. After a symbol has been stored in the input register ER, a signal is produced and further processed to the control circuit ST. A bistable flip-flop circuit Sp1 will be connected into this control circuit ST (FIG. 9) and therefore the AND gates G2 are activated by way of a monostable flip-flop circuit MK and an OR gate G6 in such a way that the information stored in the binary counter BZ and representing the position of the type carrier TT will be transferred into a test binary counter PZ. Simultaneously, a timing counter TZ and a flip-flop stage KA are reset. The position of the flip-flop stage KA obtained in this manner will indicate the importance for the control circuit SST for the stepping motor SM, that the stepping motor SM must be driven in the advance direction. After the contents of the binary counter BZ have been transferred into the test binary counter PZ, the monostable flip-flop circuit MK will flip back and activate a 200 kHz timing pulse generator for permutating the test binary counter PZ by way of a gate G1, and the test binary counter PZ will switch further in accordance with the frequency of the 200 kHz source. The comparing device V will thereby compare the information provided in the input register ER with that of the test binary counter PZ which has been switched further. The timing counter TZ will be switched further at the same frequency. The additional test decoder PD, which also may comprise a gate circuit corresponding to that illustrated in FIG. 7, recognizes the bit combinations K32, ZL Z*wr*, WR, Z*i* and B*u*, and will shift an additional timing pulse into the test binary counter PZ when such a bit combination is provided without simultaneously further switching the timing counter TZ. Therefore, an additional symbol is simulated for the comparing device V. The timing counter TZ thus counts one symbol less in this case. This corresponds to the fact that no positions for the symbols K32, ZL, Z*wr*, WR, Z*i* and B*u* are provided upon the type carrier TT.

If the comparing device V detects coincidence of the contents of the input register ER and the test binary counter PZ, the simulated adjustment of the test binary counter PZ will be finalized and the adjustment itself of the type carrier TT will be initiated by the stepping motor SM via the bistable flip-flop circuits S*p*1 and S*p*2. This means that the timing counter TZ has not reached the counting value 13; in the meantime then the flip-flop stage KA which is included in the timing counter TZ will be reset. As has been mentioned before, this means that the stepping motor SM will be driven in an advance direction. When the timing counter TZ reaches the position 13, the comparing device V announces coincidence of the contents of the input register ER and the test binary counter PZ. Then a pulse will be emitted from the timing counter TZ to initiate the adjusting process of the type carrier TT by the stepping motor SM as was done in the other case by the comparing device V by way of the bistable flip-flop stages S*p*1 and S*p*2; however, the flip-flop stage KA is simultaneously placed in a condition which indicates a reverse operation of the stepping motor SM to the control circuit SST for the stepping motor SM. Along with the adjustment of the type carrier TT, the timing pulses ZT are produced by the rotation of the timing disk TS past the optical detectors 5, 5 (converter W in FIG. 6) and pulse the binary counter BZ whereby the binary counter, depending on advance or reverse motions—the flip-flop stage KA either activates the AND gate G3 or the AND gate G4—will be switched further in the advance or reverse directions selectively by means of the timing pulses ZT, by way of one of these gates G3 or G4, respectively. Simultaneously the contents of the binary counter BZ are transferred to the test binary counter PZ by way of the gates G2, and the test binary counter PZ makes this information available to the comparing device V. During the simultaneous adjustment of the test binary counter BZ by the 200 kHz timing system, a gate G7 is blocked, so that in the case of coincidence between the contents of the input register ER and the contents of the test binary counter PZ no information can be provided by the comparing device V to the type printing device by way of the output A. Only after the adjustment process of the type carrier TT by way of the stepping motor SM has been completed, can this printing order be further processed.

Figure 7:
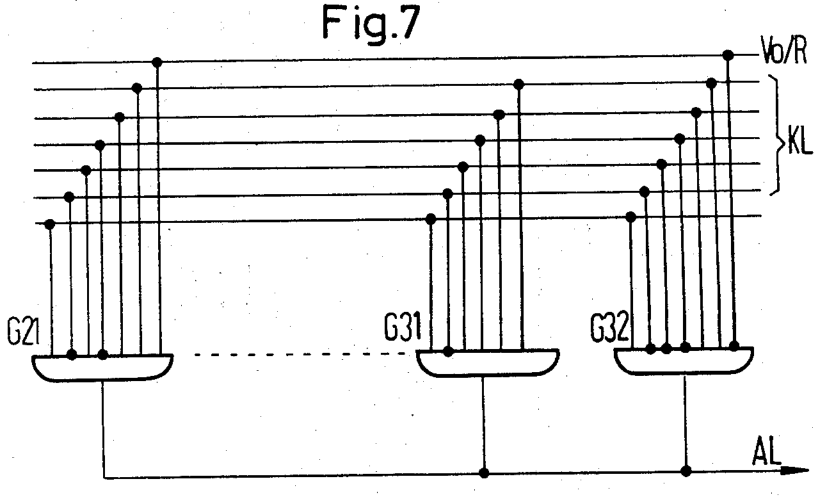
FIG. 7 is a schematic representation of a gate circuit as it is employed, for example, for decoding devices utilized in the preceding Figure.

FIG. 7 illustrates a gate circuit which, for example, may be applied for the decoders PD, ZD and D, the corresponding symbols given between the input register ER and the comparing device V or between the comparing device V and the test binary counter PZ or between the test binary counter PZ and the binary counter BZ, respectively, will be recognized over the lines KL. If one of the symbols which are to be evaluated is provided, whereby advance or reverse motion of the adjusting movement is to be taken into account a signal will be produced by way of the gates G21 . . . G32 at the output line AL, corresponding to this symbol, which signal will be further processed at the bistable flip-flop SY (FIG. 4) or at the gates G2, G3 (FIG. 5) or at the test binary counter PZ (FIG. 6), respectively. The functions which are to be carried out by the signals are explained in the corresponding descriptions of these figures.

Figure 8:
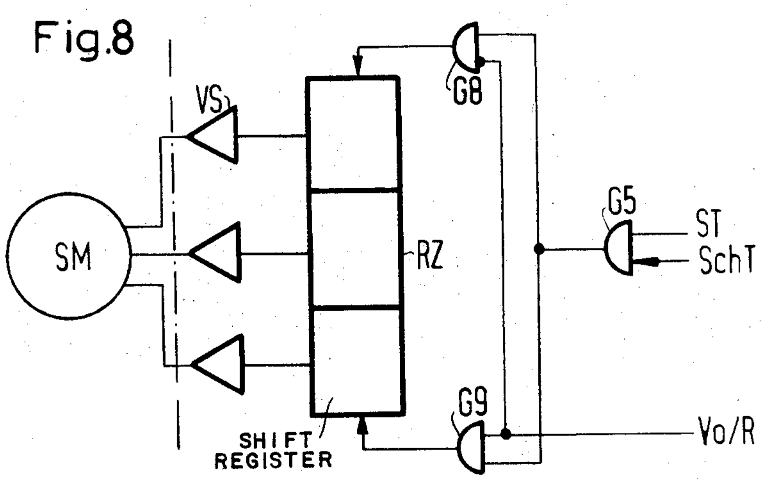
FIG. 8 is a logic circuit diagram of apparatus for controlling the stepping motor.

FIG. 8 illustrates a stepping motor SM and the control circuit SST which is required for controlling the stepping motor. The stepping motor SM in the selected example is a three-poled structure, i.e. it comprises excitations windings. Corresponding to these excitations windings are individual stages of a three-stage shift register RZ which is provided in the control circuit. Depending on the position of the shift register RZ, one of the excitation windings of the stepping motor SM will be excited by way of a corresponding interposed amplifier circuit VS. The stepping frequency is supplied to the shift register by a timing generator *SchT*, particularly by way of the AND gate G5 when the corresponding information for the adjustment movement is provided by way of the bistable flip-flop circuit ST, the direction of supply of the process for the shift register RZ is predetermined by way of the gates G8 and G9, depending on the position of the flip-flop stage KA.

Although we have described our invention by reference to a specific embodiment thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A code-controlled teleprinter for an n-digit code including a type carrier, a stepping motor for rotatably adjusting said type carrier in either direction, and a position comparing system comprising an n-digit electronic binary counter, means for permutating said n-digit binary counter including a timing disc mutually rotatable with said type carrier and having stepping marks carried circumferentially thereon, means for reading the stepping marks and producing stepping pulses in response thereto connected to said n-digit binary counter, and means controlling rotation of said stepping motor in one direction in response to a binary counter count of less than half the character stock on said type carrier and in the other direction in response to a count of more than half of the characters on said type carrier, a synchronizing mark carried on said disc and associated with a frequently occurring predetermined character, means for reading said synchronizing mark and producing a synchronizing pulse in response thereto connected to said n-digit binary counter for setting said binary counter to the n-digit code associated with said predetermined character when said synchronizing mark is read.

2. A code controlled teleprinter for an n-digit code including a type carrier, a stepping motor for rotatably adjusting said type carrier in either direction, and a position comparing system comprising an n-digit electronic binary counter, means for permutating said n-digit binary counter including a timing disc mutually rotatable with said type carrier and having stepping marks carried circumferentially thereon and means for reading the stepping marks and producing stepping pulses in response thereto connected to said n-digit binary counter, a synchronizing mark carried on said disc and associated with a frequently occurring predetermined character, means for reading said synchronizing mark and producing a synchronizing pulse in response thereto connected to said n-digit binary counter for setting said binary counter to the n-digit code associated with said predetermined character when said synchronizing mark is read, an input register for receiving incoming n-digit codes, a decoder connected to said input register for recognizing certain special function codes which are not associated with characters to be printed, an electronic comparing device for comparing incoming codes with position codes stored in said n-digit binary counter, blocking gates connected between said decoder and said comparing device and responsive to the operation of said decoder to inhibit operation of said comparing device and apply the code of the predetermined character to said register so that control of said motor is rendered dependent only on said synchronizing pulse so that said type carrier and said n-digit binary counter are synchronized upon the receipt of special function codes.

3. A teleprinter according to claim 2, comprising an additional decoder connected between said n-digit binary counter and said electronic comparing device and operated by other predetermined codes which are ahead of said special function codes and not to be printed, an auxiliary timing pulse generator operated by said additional decoder and connected to advance said n-digit binary counter without advancing said type carrier in order to avoid the provision of gaps in said type carrier associated with said other predetermined codes.

* * * * *